J. E. MATEER AND C. T. ALLCUTT.
TESTING DEVICE.
APPLICATION FILED SEPT. 1, 1917.
1,401,627.
Patented Dec. 27, 1921.
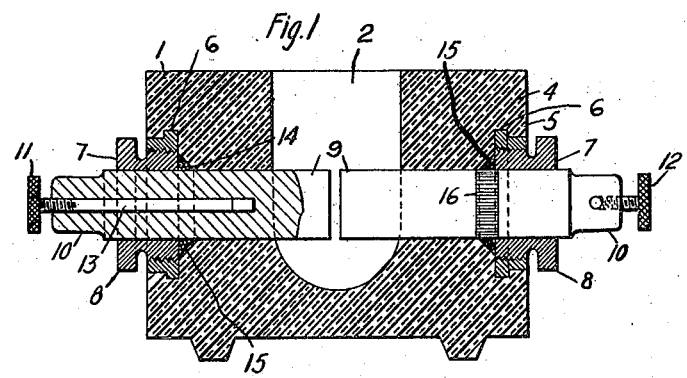
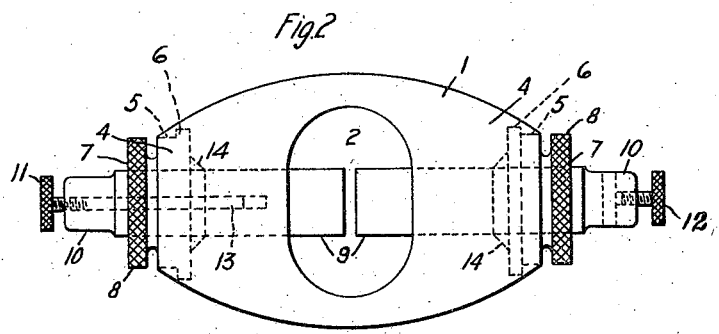
WITNESSES:
INVENTORS
Jesse E. Mateer &
Chester T. Allcutt
BY
ATTORNEY

UNITED STATES PATENT OFFICE.

JESSE E. MATEER AND CHESTER T. ALLCUTT, OF WILKINSBURG, PENNSYLVANIA, ASSIGNORS TO WESTINGHOUSE ELECTRIC & MANUFACTURING COMPANY, A CORPORATION OF PENNSYLVANIA.

TESTING DEVICE.

1,401,627.   Specification of Letters Patent.   Patented Dec. 27, 1921.

Application filed September 1, 1917. Serial No. 189,349.

*To all whom it may concern:*

Be it known that we, JESSE E. MATEER, a citizen of the United States, and a resident of Wilkinsburg, in the county of Allegheny and State of Pennsylvania, and CHESTER T. ALLCUTT, a citizen of the United States, and a resident of Wilkinsburg, in the county of Allegheny and State of Pennsylvania, have invented a new and useful Improvement in Testing Devices, of which the following is a specification.

Our invention relates to testing devices and particularly to such devices as are used for testing the insulating properties of oils and other fluids.

One object of our invention is to provide a simple and inexpensive device of the above indicated character that may be readily cleaned and that shall permit the ready removal of the electrodes forming a part thereof for the purpose of removing irregularities in the faces of the electrodes that may occur during the operation of the device.

Another object of our invention is to provide electrodes that are adapted to slide longitudinally through the walls of a receptacle and that may be locked in position and prevented from turning about their axes when the leads to the operating circuit are being attached thereto.

In practising our invention, we provide an elongated receptacle of insulating material having an aperture of cup shape in its upper side for the reception of a fluid, the dielectric strength of which is to be tested. Cylindrical electrodes extend through the end walls of the receptacle, from the outside thereof, to positions in the lower central portion of the cup, at which position, the end faces of the electrodes are spaced a sufficient distance to permit a voltage-break-down test of the fluid. We provide packing in the walls of the receptacle, surrounding the electrodes, to prevent leakage of the fluid and to coöperate with glands to rigidly hold the electrodes in adjusted position. The packing also coöperates with knurled or milled portions of the electrode surfaces to prevent turning of the electrodes and consequent alteration of the adjusted positions of the same when they are being connected to the leads of the supply circuit.

Figure 1, of the accompanying drawings, is a longitudinal sectional view of a testing device embodying our invention, and Fig. 2 is a top plan view of the testing device shown in Fig. 1.

A body member 1, of insulating material is provided in its upper side, with a well 2 of substantially cup-shape. Interiorly threaded ring bushings 5, having outer peripheral flanges 6, are embedded in relatively thick end walls 4, of the body member 1 and flush with the outer faces thereof and are adapted to receive threaded glands 7. The glands 7 have knurled adjusting heads 8 and are adapted to loosely surround the cylindrical electrodes 9 that extend through the walls 4 from the lower central portion of the well to positions outside the same where they are provided with terminals 10. The terminals 10 are provided with binder screws 11 and 12, the former of which comprises an elongated shank 13 that is adapted for use as a gap-spacing gage and is of a diameter equal to the desired length of gap. Annular grooves 14 are provided in the walls 4, adjacent the ring-bushings 5, for the reception of packing material 15 that is adapted to coöperate with the walls 4, the glands 7 and knurled or milled portions 16 of the electrode surfaces, to prevent leakage of the fluid from the cup, to lock the electrodes in adjusted position and to prevent turning of the electrodes during the time of connecting the supply-circuit leads to the terminals of the electrodes.

Previous to operation, the device may be adjusted by removing the binding screw 11 and inserting the shank 13 between the adjacent faces of the electrodes. When the glands 7 are advanced outwardly, the electrodes 9 may be so adjusted longitudinally that they may be spaced apart a distance equal to the diameter of the shank 13. When the distance between the faces of the electrodes has thus been determined, the glands 7 are advanced into the bushings 5, to lock the electrodes in position. The packing 15 intimately engages the grooves 14 in the walls 4, and the milled portion 16 of the electrodes and thereby prevents turning of the latter and provides fluid-tight joints at the apertures in the walls 4 in which the electrodes are inserted.

A fluid to be tested is placed in the cup to a depth sufficient to cover the electrodes, and the terminals 10 are connected to a suitable circuit, (not shown). The fluid may then be submitted to a voltage-break-down test across the gap.

While we have shown and described the preferred embodiment of our invention, it is to be understood that changes may be effected therein that will not depart from the spirit and scope of the same, as set forth in the appended claims.

We claim as our invention:

1. In a fluid-testing device, the combination with a fluid receptacle, of longitudinally slidable cylindrical electrodes that extend through the walls of the receptacle and each of which is provided with a milled portion intermediate its ends, packing that embraces each electrode at the said milled portion thereof, and means for causing the coaction of the packing with the milled portion and the receptacle wall to prevent turning of the electrode.

2. In a fluid-testing device, the combination with a fluid receptacle having cylindrical openings through the walls thereof, of longitudinally slidable and adjustable electrodes fitting said openings, packing means for the electrodes and means on the electrodes coöperating with the packing means for preventing the turning of the electrodes and locking the same in adjusted positions.

3. In a fluid-testing device, the combination with a fluid receptacle having an opening the walls of which constitute a relatively-large smooth bearing portion, of a longitudinally-slidable electrode conforming to, and snugly fitting, said opening to permit of ready insertion and withdrawal through, and adjustment in, the opening, and a member coöperating between said electrode and said receptacle for relatively-quickly securing said electrode in position.

4. A fluid-testing device comprising electrodes and a single means coöperating with one of the electrodes to constitute a terminal therefor and having a gap-adjusting portion for insertion between the electrodes.

5. A fluid-testing device comprising a hollow integral block of insulating material having bearing openings through the walls thereof, longitudinally-slidable and adjustable electrodes extending through said openings, and means whereby said electrodes may be secured in position and the escape of a fluid through said openings prevented.

6. A portable fluid-testing device comprising a single integral block of insulating material having a recess in one side, openings extending through said block to said recess, readily-removable electrodes longitudinally-slidable in said openings, and adjusting means for securing said electrodes in position and preventing the escape of a fluid through said openings.

In testimony whereof we have hereunto subscribed our names this 23rd day of August, 1917.

JESSE E. MATEER.
CHESTER T. ALLCUTT.